Figure 4:
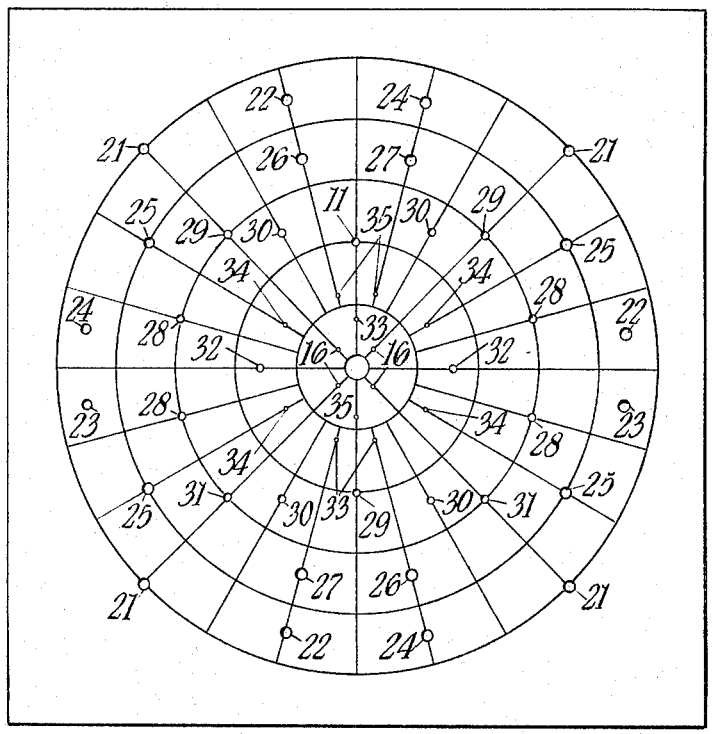

Nov. 8, 1966    A. I. FRIEDMANN    3,284,154
VISUAL FIELD TEST APPARATUS WITH FLASH TUBE ILLUMINATOR
Filed Jan. 29, 1962    2 Sheets-Sheet 1
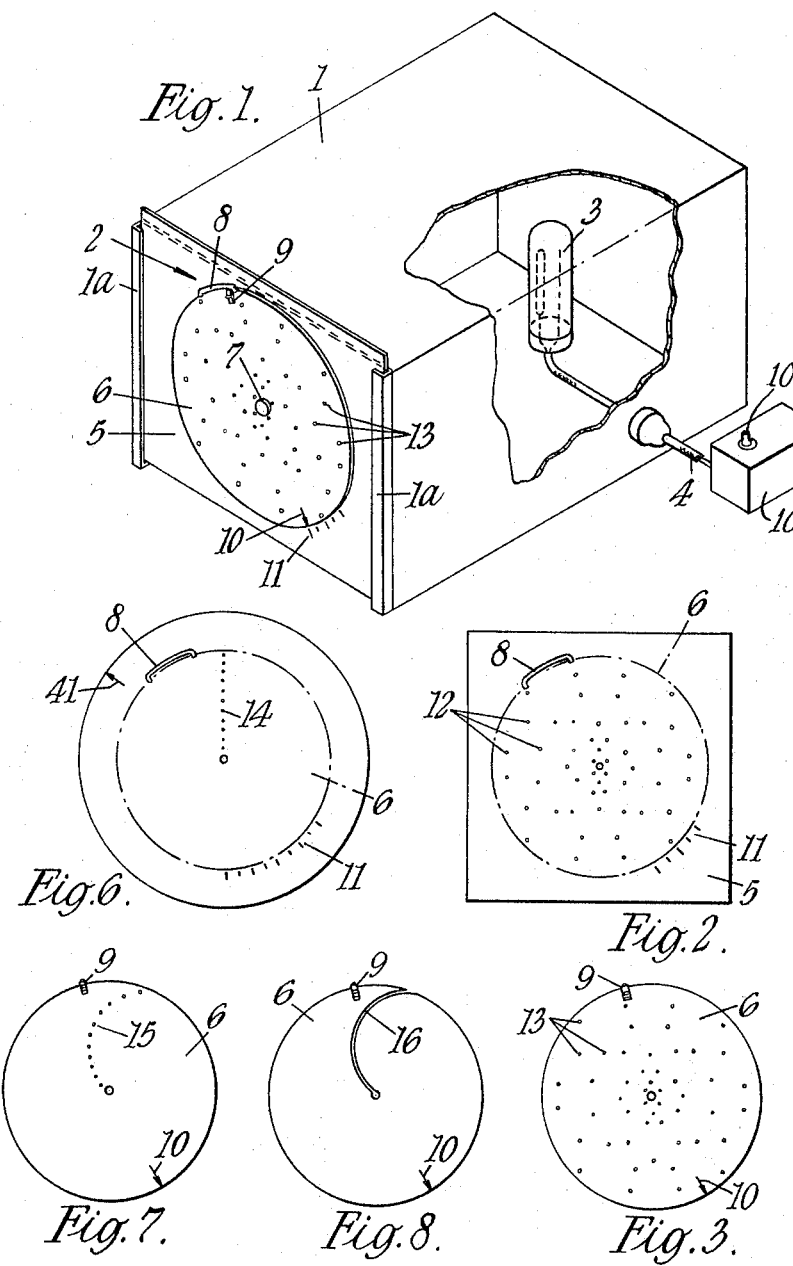

United States Patent Office 3,284,154
Patented Nov. 8, 1966

3,284,154
VISUAL FIELD TEST APPARATUS WITH
FLASH TUBE ILLUMINATOR
Allan Isadore Friedmann, 41 Maresfield Gardens,
London, England
Filed Jan. 29, 1962, Ser. No. 169,384
Claims priority, application Republic of South Africa,
Feb. 1, 1961, 61/404
1 Claim. (Cl. 351—23)

This invention relates to ophthalmic instruments, and is more particularly concerned with instruments for the purpose of testing the field of vision of the human eye.

It is an object of the present invention to provide an improved instrument for this purpose which is relatively inexpensive to manufacture and which is relatively simple to use so that it can be operated by a non-technical operator, leaving the actual interpretation of tests carried out with the aid of the instrument to a qualified person.

It is a further object of the present invention to provide an improved instrument for the above mentioned purpose, which can be readily adapted for portable operation so that it can be taken into the field and operated off any portable power supply, such as electric batteries.

The present invention consists in an instrument for testing the field of vision of the human eye, which includes a housing having means for accommodating perforated or apertured screen means and an internal source of light positioned behind the screen means for momentarily illuminating the perforations or apertures of the screen means, means being provided for changing the position or pattern of perforations or apertures upon the screen means and for identifying the pattern in use at any instant.

The invention further consists in an instrument for testing the field of vision of the human eye, which includes a housing in which is mounted screen means having a number of groups of one or more perforations or apertures formed therein, the screen means having means for selectively exposing the perforations or apertures of any one group and for indicating which group has been selected, and an internal source of light positioned behind the screen means for momentarily illuminating the perforations or apertures of the screen means.

The invention still further consists in screen means for use in an instrument as set forth in either of the two preceding paragraphs.

According to one form of the present invention, the screen means consists of a screen, having a number of groups of perforations or apertures formed therein, and a perforated or apertured shutter which is relatively moveable with respect to the screen so as to expose in each of a number of different relative positions the perforations or apertures of one group, scale means being provided for indicating which group of perforations or apertures is so exposed for each of said relative positions.

According to an alternative form of the present invention, the screen means may consist of a number of separate perforated or apertured screens, the screens being locatable one at a time in the housing, wherein each screen carries a different pattern of perforations or apertures, together with a marking or other indication of the particular pattern carried by that screen.

Figure 5:
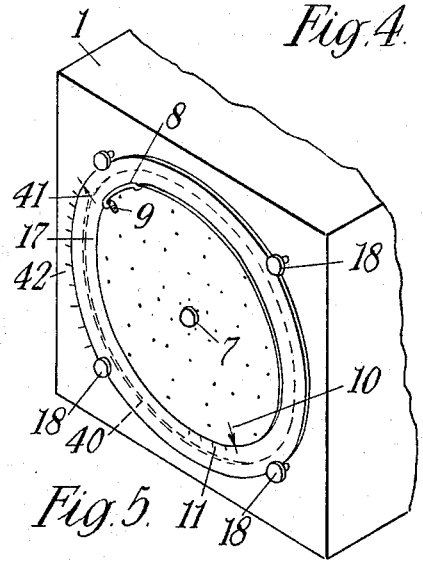
Figure 9:
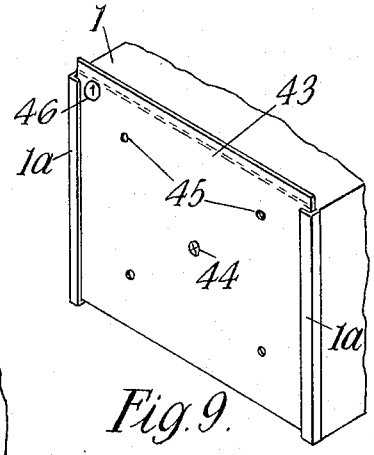

In the accompanying drawings:

FIGURE 1 is a general diagrammatic view, with portions cut away for clarity, of one form of instrument for testing the field of vision of the human eye, according to the present invention, FIGURES 2 and 3 show in more detail the components of the screen means employed in the apparatus of FIGURE 1, FIGURE 4 shows diagrammatically various patterns of perforations which may be used in the present invention, FIGURE 5 shows a portion of an alternative form of instrument according to the present invention, FIGURES 6 and 7 are views, similar to FIGURES 2 and 3, showing an alternative form of screen means for use in the instrument of FIGURE 5, FIGURE 8 is a view showing an alternative form of the component of FIGURE 7, and FIGURE 9 shows a portion of a further alternative form of instrument according to the present invention.

In carrying the invention into effect according to one convenient mode by way of example, as shown in FIGURE 1, an instrument for testing the field of vision of the human eye includes a housing 1 in one end of which is mounted screen means, indicated generally as 2, the screen means being held in position by means of flanges 1a so as to be readily removable.

The interior of the housing 1 is painted white to obtain maximum light reflection and contains a source of light, indicated diagrammatically at 3, for momentarily illuminating the screen means 2 from inside the housing 1. The light source 3 is in the form of a conventional electronic flash tube as used by photographers which runs off a portable power pack 101, to which it is connected by leads 4, the tube providing a flash whenever required by operating a push button 102. The duration of the flash is of the order of $\frac{1}{500}$ of a second, in order to prevent the patient from scanning the surface of the screen means in an attempt to locate an exposed perforation in the screen means.

In an alternative arrangement, not shown, the flash tube may be replaced by a continuous source of light and a suitable shutter interposed between the light and the screen means.

As will be seen more clearly from FIGURES 2 and 3, the screen means 2 consists of a perforated screen 5 to which is attached a circular perforated shutter 6 (whose position is shown dotted in FIGURE 2), the shutter 6 being turnable on the screen 5 about a central pivot 7. The perforations are 1 mm. in diameter towards the centre of the screen and 2 mm. in diameter towards the periphery of the screen. They may be drilled perpendicularly to the screen, or inclined at an angle towards the patient's eye. The screen 5 carries an arcuate detent 8 co-operating with a spring-loaded catch 9 so that the shutter 6 may be locked in any one of a number of angular positions with respect to the screen 5. The shutter carries an index mark 10 for indicating, on a scale 11 on the screen 5, the angular position of the shutter 6.

Perforations 12 and 13 are provided in the screen 5 and in the shutter 6 so that, for each angular position of the shutter 6, a group of perforations 12 in the screen 5, say two, three or four perforations, are exposed by alignment with a corresponding group of perforations 13 in the shutter 6. A different pattern of perforations is exposed for each angular position of the shutter 6.

It will be appreciated that it may not be possible to move the angular positions equally spaced from one another in order to avoid spurious coincidences between two perforations of different groups.

If desired, the scale 11 may indicate not only which group is exposed, but also how many perforations are in that group for easy reference by the operator.

It will be appreciated that various different patterns may be adapted, and, by way of example, FIGURE 4 shows on the one diagram sixteen different patterns or groups of perforations, numbered from 21 to 36, any one of which patterns i.e. the holes of the same number, may be selected by suitable angular positioning of the shutter 6.

In use, the patient sits before the instrument indoors, although the instrument can, however, be used outside in reasonable shade. The patient is positioned at a prescribed distance from the instrument, this being achieved for example, by means of a suitable chin rest (not shown) attached to the housing 1.

The operator then adjusts the screen means to expose one particular group of perforations, but this group cannot yet be seen, by the patient as they are not illuminated.

The patient is then asked to concentrate upon the centre pivot 7 (fixation point), which, for convenience, may be painted or which may consist of a dull red light, and the operator pushes a button to cause a flash to be emitted by the tube 3, thereby momentarily illuminating the exposed group of perforations. The extremely short duration of the flash prevents the patient from scanning the screen in search of the exposed perforations.

The patient is then asked to state how many pin holes of light he has seen, together with their relative positions, and this information is recorded by the operator together with a note of the group exposed as indicated by the scale 11.

This procedure is then repeated until the operator has sufficient information at his disposal. This information is subsequently plotted onto a chart from which the blind spots in the patient's field of vision can be determined.

From the above description, it will be clear that the operator need not be a skilled medical practitioner. A rudimentary working knowledge of working the device and plotting the information is all that is required of the operator, leaving the medical practitioner free to use his time in a more profitable manner.

FIGURE 5 of the accompanying drawings shows a modified form of instrument in which means are also provided for altering the angular position, with respect to the housing, of any pattern of perforations presented by the instrument.

In this case, the perforated screen 17 is of circular form and is mounted for rotation about its axis by means of studs 18 secured to the end wall 19 of the housing 1. The screen 17 covers a circular aperture 40 in the end wall 19 of the housing 1.

A circular shutter 6 is secured to the screen 17 as in the arrangements described above, and both the shutter 6 and the screen 17 carry perforations suitably arranged thereon in the manner previously described.

The screen 17 carries an index mark 41 which indicates upon scale 42 the angular position of the screen 17 with respect to the housing 1.

This form of the instrument enables additional tests to be carried out by using the same groups of perforations at different angular orientations. The operator must make a note of the additional reading on scale 42 each time he conducts a test in order to be able to identify the angular position at which the test was conducted.

It will be appreciated that various other arrangements may be adopted for enabling the screen 5 to be rotated about its axis.

FIGURES 6, 7 and 8 of the accompanying drawings show alternative forms of screen means for use with the instrument of FIGURE 5. With this form of screen means, only one perforation is exposed at any one time, i.e. each group consists of a single exposed perforation. In this arrangement, the screen 5 is of circular form for rotation about its axis and is provided with a number of holes 14 arranged along a straight line, and the shutter 6 is provided either with an arcuate series of holes 15 (FIGURE 7), or with an arcuate slit 16 (FIGURE 8).

Where only one perforation is exposed at a time, the index 42 will indicate, upon a scale 42 on the housing 1, the meridian of the exposed perforation.

It will be understood that various other arrangements of perforations and/or slits may be employed, and that slits may be provided in both the screen 5 and the shutter 6, the slits co-operating to define a perforation.

Additional lines of holes or slits may be provided if it is desired to expose (or create) more than one perforation at a time. For example, three or four straight lines of perforations or straight slits may be provided on the screen 5 (or the shutter 6) with three or four corresponding arcuate series of holes or arcuate slits on the shutter 6 (or the screen 5).

FIGURE 9 of the accompanying drawings shows a still further alternative form of instrument according to the present invention, in which a number of perforated cards 43 are locatable, one at a time, in the end of the housing 1 where they are held in position by flanges 1a.

Each card 43 carries a central fixation point 44, a group of perforations 45 arranged in one particular pattern, and an index mark 46 indicating which pattern of perforations is used on the card.

This form of the instrument is used in a manner similar to that previously described, with the exception that between each test the card 43 is removed from the housing 1 and a further card carrying a different pattern of perforations is substituted for it.

If desired any of the arrangements previously described may be provided with filters by means of which the intensity and/or colour of illumination of the perforations may be changed as desired. The apparent intensity of the illuminated exposed perforations may also be altered with the aid of an external continuous or flashed light shining upon the exterior of the screen means.

If desired, the flash tube may be replaced by a flickering light source for testing the reaction of the patient's eye to the flickering light.

As a further test, one screen may be provided, or one position of the shutter 6 arranged, so that an even distribution of exposed perforations is presented over the whole of the screen means. The patient is then asked to state if it appears to him that any perforations are missing from the even distribution, which would indicate the presence of a blind spot in his vision.

Various modifications may be made within the scope of the present invention.

I claim:

Apparatus for testing the field of vision of the human eye, which includes a housing, screen means mounted in said housing, said screen means defining a plurality of groups of apertures of which each group is arranged in a predetermined pattern in accordance with a visual test to be carried out upon the field of vision, a shutter mounted adjacent said screen means whereby only one of said groups of apertures is exposed for viewing, means for moving said shutter relatively to said screen means and thereby selectively exposing for viewing alternative ones of said groups of apertures, means for identifying the relative positions of the screen means and shutter and thereby indicating the particular group of apertures exposed for viewing at any instant, an electronic flash tube mounted within said housing for momentarily rendering visible all of the apertures of the exposed group of apertures for a period of about 1/500 of a second, and means for activating said flash tube at any desired instant.

References Cited by the Examiner
UNITED STATES PATENTS

| | | | |
|---|---|---|---|
| 886,772 | 4/1908 | Dodge | 351—17 |
| 2,564,794 | 8/1951 | Shekels | 88—20 |
| 2,779,235 | 1/1957 | Chamlin | 88—20 |
| 2,835,162 | 5/1958 | Harrington et al. | 88—20 |

FOREIGN PATENTS

| | | |
|---|---|---|
| 463,877 | 12/1913 | France. |
| 926,748 | 4/1955 | Germany. |

OTHER REFERENCES

Mayer: The Evolution of Flash Perimetry, American Journal of Ophthalmology, vol. 20, 1937, pp. 828–830.

Zugsmith et al.: A Simple, More Accurate Means of Charting Visual Fields, American Journal of Ophthalmology, vol. 32, November 1949, pp. 1573 to 1576.

DAVID H. RUBIN, *Primary Examiner.*

JEWELL H. PEDERSEN, *Examiner.*

T. L. HUDSON, *Assistant Examiner.*